United States Patent
Abhinav et al.

(10) Patent No.: US 11,189,281 B2
(45) Date of Patent: Nov. 30, 2021

(54) METHOD AND SYSTEM FOR AUTOMATICALLY MANAGING OPERATIONS OF ELECTRONIC DEVICE

(71) Applicant: Samsung Electronics Co., Ltd., Suwon-si (KR)

(72) Inventors: Thanda Abhinav, Bangalore (IN); Dilip Kumar Margam, Telangana (IN); Rohith Chandrashekhar Aralikatti, Bangalore (IN); Shankar Mosur Venkatesan, Bangalore (IN); Tanay Sharma, Banswara (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 16/494,533

(22) PCT Filed: Mar. 19, 2018

(86) PCT No.: PCT/KR2018/003196
§ 371 (c)(1),
(2) Date: Sep. 16, 2019

(87) PCT Pub. No.: WO2018/169381
PCT Pub. Date: Sep. 20, 2018

(65) Prior Publication Data
US 2020/0105262 A1 Apr. 2, 2020

(30) Foreign Application Priority Data

Mar. 17, 2017 (IN) .............................. 201741009370
Mar. 15, 2018 (IN) .............................. 201741009370

(51) Int. Cl.
*G10L 15/22* (2006.01)
*G10L 15/02* (2006.01)
(Continued)

(52) U.S. Cl.
CPC .............. *G10L 15/22* (2013.01); *G10L 15/02* (2013.01); *G10L 15/063* (2013.01); *G10L 15/20* (2013.01); *G10L 2015/223* (2013.01)

(58) Field of Classification Search
CPC ....... G10L 15/22; G10L 15/02; G10L 15/063; G10L 15/20; G10L 2015/223
See application file for complete search history.

(56) References Cited

U.S. PATENT DOCUMENTS 6,219,639 B1 * 4/2001 Bakis ................. G06K 9/00885
382/116
7,586,549 B2 9/2009 Heo
(Continued)

FOREIGN PATENT DOCUMENTS

JP 2006-005440 A 1/2006
KR 10-2007-0061207 A 6/2007

OTHER PUBLICATIONS

Lip reading, Wikipedia, https://en.wikipedia.org/wiki/Lip_reading; Jun. 21, 2007.
(Continued)

*Primary Examiner* — Michael Colucci
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
Accordingly, the embodiments herein provide a method for managing operations of an electronic device. The method
(Continued)

includes transmitting an input signal corrupted by noise to a trained model with a plurality of output states. Further, the method includes dynamically determining an entropy for the plurality of output states of the trained model. Further, the method includes determining whether the entropy exceeds a pre-defined threshold. Furthermore, the method includes automatically enabling an electronic device module of the electronic device in response to determining that the entropy exceeds the pre-defined threshold.

13 Claims, 13 Drawing Sheets

(51) Int. Cl.
*G10L 15/06* (2013.01)
*G10L 15/20* (2006.01)

(56) References Cited

U.S. PATENT DOCUMENTS

| | | | |
|---|---|---|---|
| 7,856,549 B2 | 12/2010 | Wheeler | |
| 2003/0055655 A1* | 3/2003 | Suominen | G06F 3/167 704/276 |
| 2003/0093419 A1* | 5/2003 | Bangalore | G01C 21/3679 |
| 2007/0136071 A1 | 6/2007 | Lee et al. | |
| 2010/0063813 A1* | 3/2010 | Richter | G10L 15/02 704/231 |
| 2010/0138223 A1* | 6/2010 | Koshinaka | G10L 15/08 704/245 |
| 2011/0071830 A1* | 3/2011 | Kim | G06K 9/00335 704/246 |
| 2011/0184734 A1 | 7/2011 | Wang et al. | |
| 2014/0086489 A1* | 3/2014 | Motoi | G06K 9/18 382/187 |
| 2015/0081287 A1 | 3/2015 | Elfenbein et al. | |
| 2015/0081295 A1* | 3/2015 | Yun | G06F 21/32 704/236 |
| 2015/0279364 A1* | 10/2015 | Krishnan | G10L 15/25 704/251 |
| 2015/0340040 A1 | 11/2015 | Mun et al. | |
| 2016/0085372 A1 | 3/2016 | Munemoto et al. | |
| 2017/0040017 A1* | 2/2017 | Matthews | G10L 25/57 |
| 2018/0268812 A1* | 9/2018 | Kim | G10L 25/78 |

OTHER PUBLICATIONS

Huang and Kingbury; "Audio-Visual Deep Learning for Noise Robust Speech Recognition"; IBM T. J. Watson Research Center, Yorktown Heights, NY, USA; Oct. 21, 2013.

ESTELLERS and THIRAN; "Multi-pose lipreading and audio-visual speech recognition"; http://asp.eurasipjournals.com/content/2012/1/51; Apr. 2, 2015.

Summerfield; "Lipreading and Audio-Visual Speech Perception"; The Royal Society Publishing; www.jstor.org/stable/55477.

Potamianos et al.; "Recent Advances in the Automatic Recognition of Audiovisual Speech"; Proceedings of the IEEE, vol. 91, No. 9, Sep. 2003.

Mermelsein; "Distance measures for speech recognition"; Haskins Labs, New Haven CT.; 1976.

Ngiam et al.; "Multimodal Deep Learning"; Computer Science Department, Stanford University, Stanford, CA 94305, USA; Computer Science and Engineering Division, University of Michigan, Ann Arbor, MI 48109, USA; 2011.

Mroueh et al.; "Deep Multi-Modal Learning for Audio-Visual Speech Recognition"; IBM T.J Watson Research Center; Poggio Lab, CSAIL, LCSL, Massachussetts Institute of Technology and Istituto Italiano di Tecnologia; Jan. 23, 2015.

Mcgurk et al.; "Hearing Lips and Seeing Voices"; Department of Biology, Virgina Polytechnic Institute and State University, Blacksburg, Virgina 24061.

\* cited by examiner

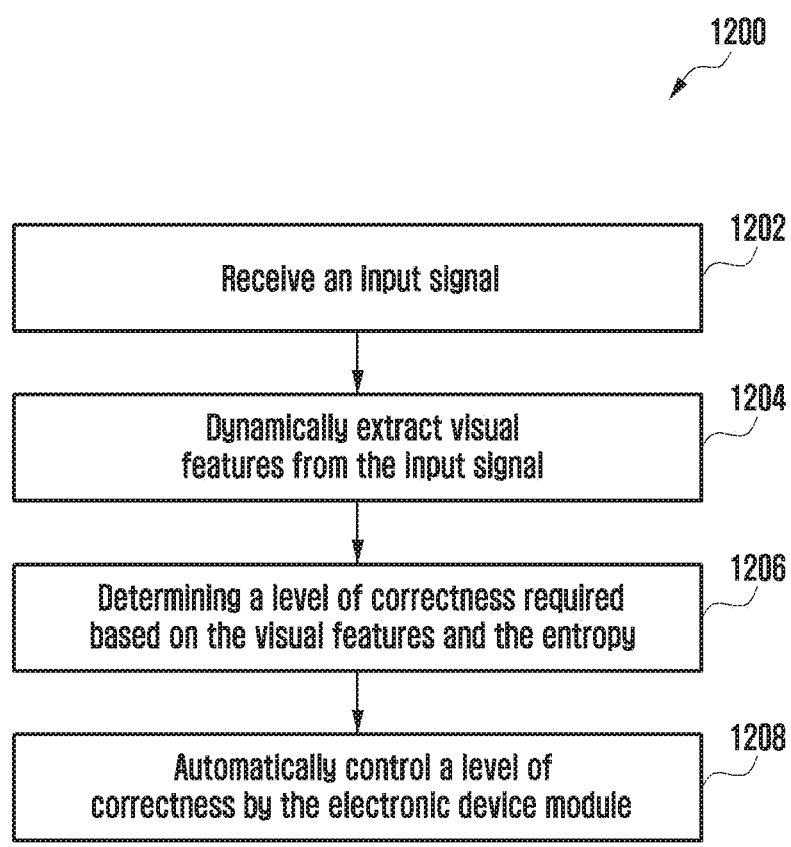

METHOD AND SYSTEM FOR AUTOMATICALLY MANAGING OPERATIONS OF ELECTRONIC DEVICE

TECHNICAL FIELD

The present disclosure relates to a recognition system, and more specifically to a method and system for automatically managing operations of an electronic device using the recognition system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Managing operations of an electronic device include enabling or disabling of electronic modules based on recognition of input signals. In many instances input signals to an electronic device can be corrupted by extraneous noise or any other interference which hampers recognition of the signal. Accordingly, many noise detection mechanisms and other interference detection mechanisms have been implemented to detect and reduce the noise to enhance recognition of input signals.

DISCLOSURE OF INVENTION

Technical Problem

Specifically, noise hampers speech recognition in automatic speech recognition (ASR) systems. An ASR system can suffer from a loss in accuracy, when the speech signal is corrupted by a high noise. For example, when the user is located at a street, at a restaurant, at a party, or on a bus, where a background noise can interfere with the user's own voice during communication. Hence, the ASR system is susceptible to the background noise and other interference which results in degradation of the accuracy of the ASR system.

There are numerous other mechanisms where interference in input signals is a hindrance. There remains a necessity to provide a mechanism that can mitigate the effects of such interference in managing operations of an electronic device or any signal recognition mechanism.

Thus, it is desired to address the above mentioned disadvantages or other shortcomings or at least provide a useful alternative.

Solution to Problem

Accordingly, the embodiments herein provide a method for managing operations of an electronic device. The method includes transmitting an input signal corrupted by noise to a trained model with a plurality of output states. Further, the method includes dynamically determining an entropy for the plurality of output states of the trained model. Further, the method includes determining whether the entropy exceeds a pre-defined threshold. Furthermore, the method includes automatically enabling an electronic device module of the electronic device in response to determining that the entropy exceeds the pre-defined threshold.

In an embodiment, the method further includes dynamically determining the entropy for the plurality of output states of an augmented trained model, determining whether the entropy falls below a pre-defined threshold, and automatically disabling the electronic device module in response to determining that the entropy has fallen below the pre-defined threshold.

In an embodiment, the entropy is determined by estimating a probability distribution for the plurality of output states of the trained model and determining the entropy of the probability distribution.

In an embodiment, the method further includes capturing a series of visual image frames of a user using the electronic device module, dynamically extracting lip movements of the user from the series of visual images frames, dynamically extracting acoustic features from the input signal, transmitting the lip movements and the acoustic features to the augmented trained model and recognizing a speech of the user using the augmented trained model.

In an embodiment, recognizing the speech of the user includes determining a first portion of the speech from the acoustic features, determining a second portion of the speech from the visual features and recognizing the speech of the user by appending the first portion and the second portion.

In an embodiment, dynamically extracting lip movements of the user from the series of visual images frames includes detecting whether lip movements of the user are in at least one visual image frame of the series of visual image frames and extracting the lip movements of the user from the at least one image frame of the series of visual image frames.

In an embodiment, the method further includes dynamically extracting co-ordinate features of a pen movement from the input signal, identifying at least one region of interest to be corrected based on the entropy by the electronic device module, and automatically providing an indication to the user on a screen of the electronic device specifying at least one region of interest to be corrected.

In an embodiment, the method further includes dynamically extracting visual features from the input signal, determining a level of correctness required based on the visual features and the entropy, and automatically controlling a level of correctness by the electronic device module.

In an embodiment, an indication is displayed on a screen of the electronic device specifying that the input signal is corrupted by noise in response to determining that the entropy exceeds the pre-defined threshold.

Accordingly, the embodiments herein provide an electronic device to automatically managing operations. The electronic device includes a recognition engine operably coupled to a memory and a processor. The recognition engine is configured to transmit an input signal corrupted by noise to a trained model with a plurality of output states. Further, the recognition engine is configured to dynamically determine an entropy for the plurality of output states of the trained model. Further, the recognition engine is configured to determine whether the entropy exceeds a pre-defined threshold. Furthermore, the recognition engine is configured to automatically enable an electronic device module in response to determining that the entropy exceeds the pre-defined threshold.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The principal object of the embodiments herein is to provide a method and system for managing operations of an electronic device using a recognition system.

Another object of the embodiments herein is to dynamically determine an entropy for a plurality of output states of a trained model.

Another object of the embodiments herein is to determine whether the entropy exceeds a pre-defined threshold.

Another object of the embodiments herein is to automatically enable an electronic device module of the electronic device in response to determining that the entropy exceeds the pre-defined threshold.

Another object of the embodiments herein is to determine whether the entropy has fallen below the pre-defined threshold.

Another object of the embodiments herein is to automatically disable the electronic device module of the electronic device in response to determining that the entropy has fallen below the pre-defined threshold.

Another object of the embodiments herein is to estimate a probability distribution for the plurality of output states of the trained model.

Another object of the embodiments herein is to determine the entropy of the probability distribution.

Another object of the embodiments herein is to dynamically extract lip movements of a user from a series of visual images frames.

Another object of the embodiments herein is to dynamically extract acoustic features from the input signal.

Another object of the embodiments herein is to recognize a speech of the user using an augmented trained model, where the lip movements and the acoustic features are fed into the augmented trained model.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 12 is a flow diagram illustrating various operations for automatically controlling a level of correctness of an input signal based on the entropy, according to an embodiment as disclosed herein.

MODE FOR THE INVENTION

Figure 1:
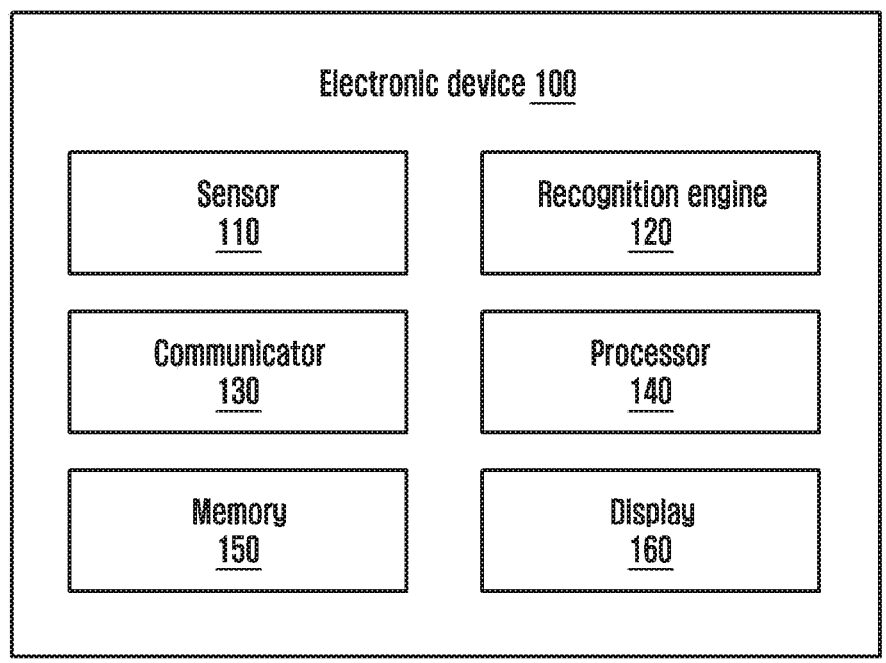
FIG. 1 is a block diagram illustrating various hardware components of an electronic device, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "acoustic" and "speech" used herein can be used interchangeably without departing from the scope of the embodiments.

Accordingly, the embodiments herein provide a method for managing operations of an electronic device. The method includes transmitting an input signal corrupted by noise to a trained model with a plurality of output states. Further, the method includes dynamically determining an entropy for the plurality of output states of the trained model. Further, the method includes determining whether the entropy exceeds a pre-defined threshold. Furthermore, the method includes automatically enabling a sensor of the electronic device in response to determining that the entropy exceeds the pre-defined threshold.

Unlike conventional systems and methods, the proposed method can be used to recognize a speech uttered by a user using a speech signal and lip movements of the user. Hence, the proposed method results in a robust ASR system with a high accuracy.

Unlike conventional systems and methods, the sensor is enabled to capture the lip movements of the user, when noise is detected along with the input signal. This results in recognizing the speech of the user in a high accuracy and also conserves power.

For example, when the user is travelling in a bus and provide a voice command to the electronic device, then in the conventional system, the camera is enabled to capture the lip movement to detect the voice command. Further, in the convention systems, even when the user reaches a noise-free environment (e.g., home), the camera is always enabled to capture the lip movement, which results in consuming huge amount of power. Unlike conventional systems and methods, in the proposed method, the camera is enabled only when there is more noise in the input signal such as the user is in the bus (such as noisy environment) and if the user reaches the home (such as noise-free environment), the camera is automatically disabled to reduce the power consumption.

Unlike conventional systems and methods, the proposed system is an automatic, an unobtrusive and a real-time recognition system based on dynamically determining the entropy.

Consider an example scenario, in which the user is in a party (i.e., the noisy environment) and trying to orally communicate with another user (in a remote place) using his/her electronic device. The user provides the voice command to the electronic device. The electronic device receives the input signal which includes an audio signal and a noise signal. Based on the proposed method, the electronic device transmits the input signal to the trained model which provides a plurality of output states. Further, the electronic device dynamically determines the entropy for the plurality of output states of the trained model. Further, the electronic device determines whether the entropy exceeds a pre-defined threshold. The electronic device can be configured to enable the camera for capturing a visual image of the user in response to determining that the entropy exceeds a pre-defined threshold. The electronic device extracts the lip movement from the visual image of the user and acoustic features from the input signal. Furthermore, the electronic device detects the speech of the user based on the lip movements and the acoustic features. The electronic device further determines whether the entropy is less than the pre-defined threshold. Further, the electronic device can be configured to disable the camera in response to determining that the entropy is less than the pre-defined threshold. This results in an improved accuracy for recognizing the speech of the user in the noisy environment (i.e., party) with the reduced power consumption.

Referring now to the drawings, and more particularly to FIGS. 1 through 12, there are shown preferred embodiments.

FIG. 1 is a block diagram illustrating various hardware components of an electronic device 100, according to an embodiment as disclosed herein. The electronic device 100 can be, for example, but not limited to, a smartphone, a smart watch, a laptop, a mobile phone, a desktop computer, a Personal Digital Assistant (PDA), a tablet computer or any other electronic device. In an embodiment, the electronic device 100 includes a sensor 110, a recognition engine 120, a communicator 130, a processor 140, a memory 150 and a display 160.

In an embodiment, the sensor 110 is configured to capture an input signal, where the input signal is corrupted by noise due to presence of a background noise. Hence, the input signal includes both the data signal and the noise signal. The data signal can be at least one of a speech signal, a visual signal and a text signal.

In an embodiment, the sensor 110 can be the hardware component in the electronic device. In an example, the sensor 110 can be at least one of a camera, an infrared sensor, an accelerometer sensor, a gyroscope sensor, an orientation sensor, a motion sensor, or the like. In another embodiment, the sensor 110 can be a software module in the electronic device. In an example, the sensor 110 can be at least one of a signal processor, a speech signal corrector, an image corrector or the like. In an embodiment, the sensor 110 can be an electronic device module in the electronic device.

The recognition engine 120 is configured to transmit the input signal corrupted by noise to a trained model. The trained model is configured to train the input signal to provide the plurality of output states. In an example, the trained model can be an acoustic model, a lip reading model, a Gaussian Mixture Model-Hidden Markov Model (GMM-HMM), or deep neural networks, an Artificial Neural Network (ANN), a Finite State Machine (FSM) model, a pattern classification model, a learnt model or the like. The trained model is trained using a known data to recognize, detect, or classify the input signal.

In an embodiment, the trained model used herein is the acoustic model. In an embodiment, the recognition engine 120 is configured to estimate a probability distribution for the plurality of output states of the trained model. Further, the recognition engine 120 is configured to dynamically determine an entropy of the probability distribution. The entropy is the measure of an amount of uncertainty outputted by the trained model. Further, when there is more noise in the input signal then, the entropy of the plurality of output states increases linearly.

In an embodiment, the recognition engine 120 is configured to determine the entropy for the probability distribution of the plurality of output states continuously. In another embodiment, the recognition engine 120 is configured to determine the entropy for the probability distribution of the plurality of output states periodically.

In an embodiment, the recognition engine 120 is configured to determine whether the entropy exceeds a pre-defined threshold. For example, the pre-defined threshold can be a threshold value (such as 0 dB) above which the noise in the input signal increases. If the entropy does not exceed the pre-defined threshold then, there is no less or tolerable noise in the input signal and the recognition engine 120 can be configured to decode the input signal. For example, if the user is in a home (such as noise-free environment) and provides voice command to the electronic device 100 then, the recognition engine 120 recognizes the voice command only through acoustic features associated with the voice command, as the noise is very low. This results in reducing the power consumption of the sensor 110.

In an embodiment, if the entropy exceeds the pre-defined threshold then, the recognition engine 120 is configured to automatically enable the sensor 110. Further, the sensor 110 is configured to capture a series of visual image frames of the user. In an example, the sensor 110 is the camera which captures the series of visual image frames of the user. The recognition engine 120 is configured to determine a first portion of the speech from the acoustic features. Further, the recognition engine 120 is configured to determine a second portion of the speech from the visual features. Furthermore, the recognition engine 120 is configured to recognize the speech of the user by appending the first portion and the second portion.

In an embodiment, the recognition engine 120 is configured to dynamically extract the acoustic features from the input signal. Further, recognition engine 120 is configured to transmit the acoustic features to the trained model. The trained model is configured to train the input signal to provide the model containing the plurality of output states. The trained model used herein is the acoustic model.

Further, the recognition engine 120 is configured to detect whether the lip movements of the user are in at least one visual image frame of the series of visual image frames. Further, the recognition engine 120 is configured to extract the lip movements of the user from the series of visual images frames. Further, recognition engine 120 is configured to transmit the lip movements of the user to the trained model. The trained model is configured to train the input signal to provide the plurality of output states. The trained model used herein is the visual model.

Furthermore, the recognition engine 120 is configured to recognize a speech of the user using an augmented trained model. In an example, for the ASR system, the augmented trained model is a combination of the acoustic model and the lip reading model.

After the sensor 110 is enabled, the recognition engine 120 is configured to dynamically determine the entropy for the plurality of output states of the augmented trained model. In an embodiment, the augmented trained model is a fusion model. In an example, the fusion model the augmented trained model is a combination of the acoustic model and the lip reading model Consider a scenario in which the user is in the noisy environment (such as street) then, the recognition engine 120 recognizes the speech of the user using the augmented trained model where the augmented trained model trains the lip movements and the acoustic features of the input signal.

In an embodiment, the augmented trained model includes at least two distinct trained model in parallel, then increasing the entropy can be substituted with the concept of increasing KL-divergence between the probabilities of the output states of these two distinct trained model. In an example, the fusion model the augmented trained model is a combination of the acoustic model and the visual model.

In an embodiment of speech recognition, the augmented trained model includes the acoustic model and the lip reading model. The entropy used herein is the Kullback-Leibler (KL) divergence measure of the augmented trained model. The KL divergence is a measure of how one probability distribution (e.g., the acoustic model) diverges from a second, related probability distribution (e.g., the visual model).

The recognition engine 120 is configured to determine whether the KL divergence falls below the pre-defined threshold. Further, the recognition engine 120 is configured to automatically disable the sensor 110 in response to determining that the KL divergence has fallen below the pre-defined threshold.

In an embodiment, the recognition engine 120 is configured to dynamically extract co-ordinate features of a pen movement from the input signal. In an example, the recognition engine 120 is configured to dynamically extract co-ordinate features from a pen, a stylus, or the like. Further, the recognition engine 120 is configured to identify at least one region of interest (ROI) to be corrected based on the entropy for the extracted co-ordinate features. Furthermore, the recognition engine 120 is configured to automatically provide an indication to the user on a screen of the electronic device 100 indicating that the at least one ROI to be corrected. In response to the indication, the user takes further action such as writing more legibly using the stylus on the screen or the like. In some embodiments, the action can be but not limited to turning on additional lights or a flash, changing an orientation of the screen and the like.

In an example, consider a scenario in which the user writes a text on the screen of the electronic device 100 using the stylus. Further, the electronic device 100 extracts the co-ordinate features of a stylus movement and determine an amount of unintelligibility of the text by computing the entropy. If the entropy increases, the amount of unintelligibility of the text also increases. Further, the recognition engine 120 identifies the ROI to be corrected due to the increase in the unintelligibility of the text. Further, the recognition engine 120 provides the indication on a screen indicating that the ROI to be corrected.

In an embodiment, the recognition engine 120 is configured to dynamically extract the visual features from the input signal. The recognition engine 120 is configured to determine a level of correctness required based on the visual features and the entropy. Further, the recognition engine 120 is configured to automatically control a level of correctness by the sensor 110.

In an example, consider a scenario in which the user captures the visual image. However, due to the noise (such as blur, low light) the visual image is unclear. The recognition engine 120 determines the entropy for the visual features associated with the visual image. Further, the recognition engine 120 determines the level of correctness required based on the visual features and the entropy. The level of correctness can be for example sharpness of the visual image, contrast of the visual image, brightness of the visual image, and illumination of the visual image or the like. Further, the recognition engine performs the level of correctness on the visual image to improve the accuracy of the visual image.

The communicator 130 is configured to communicate internally between hardware components in the electronic device 100. The processor 140 is coupled with the memory 150 for processing various instructions stored in the memory 150 to automatically manage operations of the electronic device 100.

The memory 150 can be configured to store the instructions to be executed by the processor 140. The memory 150 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 150 may, in some examples, be considered a non-transitory storage medium. The term "non-transitory" may indicate that the storage medium is not embodied in a carrier wave or a propagated signal. However, the term "non-transitory" should not be interpreted that the memory 150 is non-movable. In some examples, the memory 150 can be configured to store larger amounts of information than the memory. In certain examples, a non-transitory storage medium may store data that can, over time, change (e.g., in Random Access Memory (RAM) or cache).

In an embodiment, the display 160 can be configured to display a recognized output to the user. Further, the display 160 can be configured to provide the indication indicates that the input signal is corrupted by noise in response to determining that the entropy exceeds the pre-defined threshold. The display 160 can be, for example, but not limited to a Liquid Crystal Display (LCD), an Active Matrix Organic Light Emitting Diode (AM-OLED) display, a Light Emitting Diode (LED) display, or the like.

Although the FIG. 1 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function of automatically managing operations of the electronic device 100.

Figure 2:
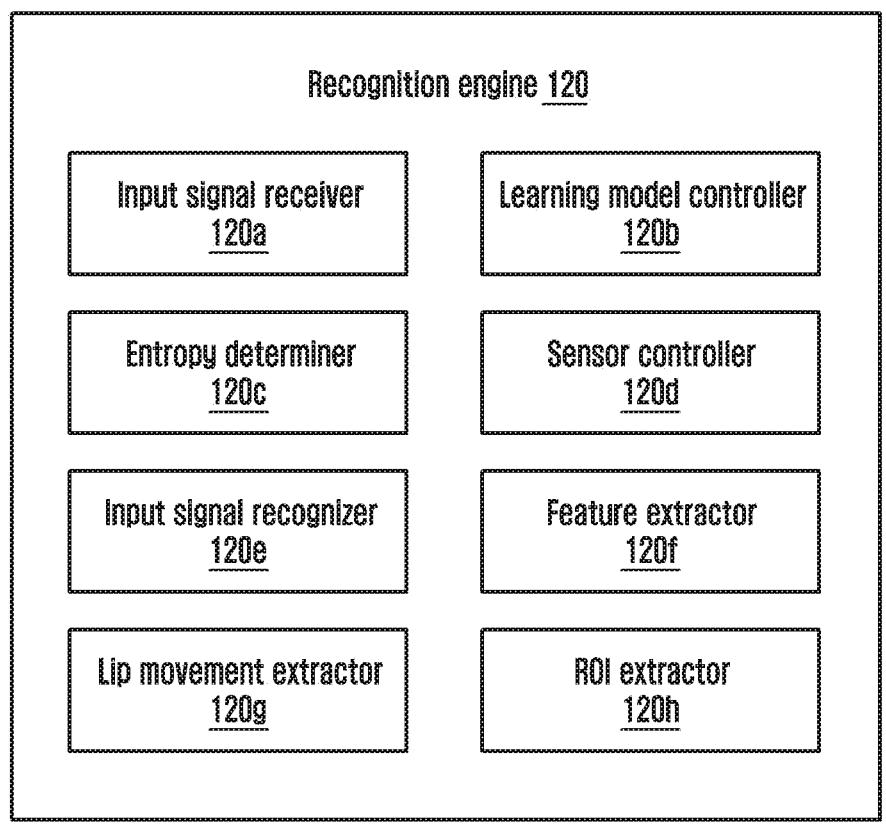
FIG. 2 is a block diagram illustrating various hardware components of a recognition engine of the electronic device, according to an embodiment as disclosed herein.

FIG. 2 is a block diagram illustrating various hardware components of a recognition engine 120 of the electronic device 100, according to an embodiment as disclosed herein. In an embodiment, the recognition engine 120 includes an input signal receiver 120a, a trained model controller 120b, an entropy determiner 120c, a sensor controller 120d, an input signal recognizer 120e, a feature extractor 120f, a lip movement extractor 120g, and a Region of Interest (ROI) extractor 120h.

In an embodiment, the input signal receiver 120a is configured to obtain the input signal of the user from the sensor 110. The sensor 110 receives the input signal includes the noise signal and the data signal.

In an embodiment, the trained model controller 120b is configured to transmit the input signal corrupted by noise to the trained model. Further, the trained model is configured to estimate a probability distribution for the plurality of output states of the trained model.

In an embodiment, the entropy determiner 120c is configured to determine an entropy of the probability distribution. Further, the entropy determiner 120c is configured to determine whether the entropy exceeds a pre-defined threshold. If the entropy does not exceed the pre-defined threshold then, there is less noise signal in the input signal and the input signal recognizer 120e can decode the input signal accurately.

In an embodiment, the entropy can be a well-known Shannon entropy, or any similar measure, is a measure estimated from a certain subset of plurality output states. Further, the entropy monotonically increases with the increase in noise.

In an embodiment, the entropy is computed on a probability-like distribution of the plurality of output states, which can a posterior distribution, or a likelihood distribution, or any such distribution, which can be correctly converted into a true probability distribution and then converted into the entropy.

In an embodiment, the entropy can be a combination of the trained model entropy as mentioned above and a time-window-entropy of the input signal itself (where a dynamic time-window-size is selected such that rate of changes of the true signal are fewer in this window, whereas the noise changes are far more numerous).

In an embodiment, if the entropy exceeds the pre-defined threshold then, the sensor controller 120d is configured to automatically enable the sensor 110. Further, the sensor 110 is configured to capture a series of visual image frames of the user. In an example, the sensor 110 is the camera which captures the series of visual image frames of the user. The input signal recognizer 120e is configured to determine the first portion of the speech from the acoustic features. Further, the input signal recognizer 120e is configured to determine the second portion of the speech from the visual features. Furthermore, the input signal recognizer 120e is configured to recognize the speech of the user by appending the first portion and the second portion.

In an embodiment, the feature extractor 120f is configured to dynamically extract the acoustic features from the data signal. The lip movement extractor 120g is configured to detect whether the lip movements of the user are in at least one visual image frame of the series of visual image frames. Further, the lip movement extractor 120g is configured to extract the lip movements of the user from the series of visual images frames. Further, the trained model controller 120b is configured to transmit the extracted lip movements and the acoustic features to the augmented trained model. Furthermore, the input signal recognizer 120e is configured to recognize the speech of the user using the augmented trained model.

After the sensor 110 is enabled, the entropy determiner 120c is configured to dynamically determine the entropy for the plurality of output states of the trained model. In an embodiment of speech recognition, the trained model includes the acoustic model and the lip reading model. The entropy determiner 120c is configured to determine whether the entropy falls below the pre-defined threshold. Further, the sensor controller 120d is configured to automatically disable the sensor 110 in response to determining that the entropy has fallen below the pre-defined threshold.

In an embodiment, the feature extractor 120f is configured to dynamically extract co-ordinate features of a pen movement from the input signal. In an example, the feature extractor 120f is configured to dynamically extract co-ordinate features from a pen, a stylus, or the like. The ROI extractor 120h is configured to identify at least one region of interest (ROI) to be corrected based on the entropy for the extracted co-ordinate features. Furthermore, the display 160 is configured to automatically provide an indication to the user on the screen of the electronic device 100 indicating that the at least one ROI to be corrected.

In an embodiment, the feature extractor 120f is configured to dynamically extract the visual features from the input signal. The entropy determiner 120c is configured to determine a level of correctness required based on the visual features and the entropy. Further, the sensor controller 120d is configured to automatically control a level of correctness by the sensor 110.

Although the FIG. 2 shows various hardware components of the recognition engine 120 but it is to be understood that other embodiments are not limited thereon. In other embodiments, the recognition engine 120 may include less or more number of components. Further, the labels or names of the components are used only for illustrative purpose and does not limit the scope of the invention. One or more components can be combined to perform same or substantially similar function of automatically managing operations of the electronic device 100.

Figure 3:
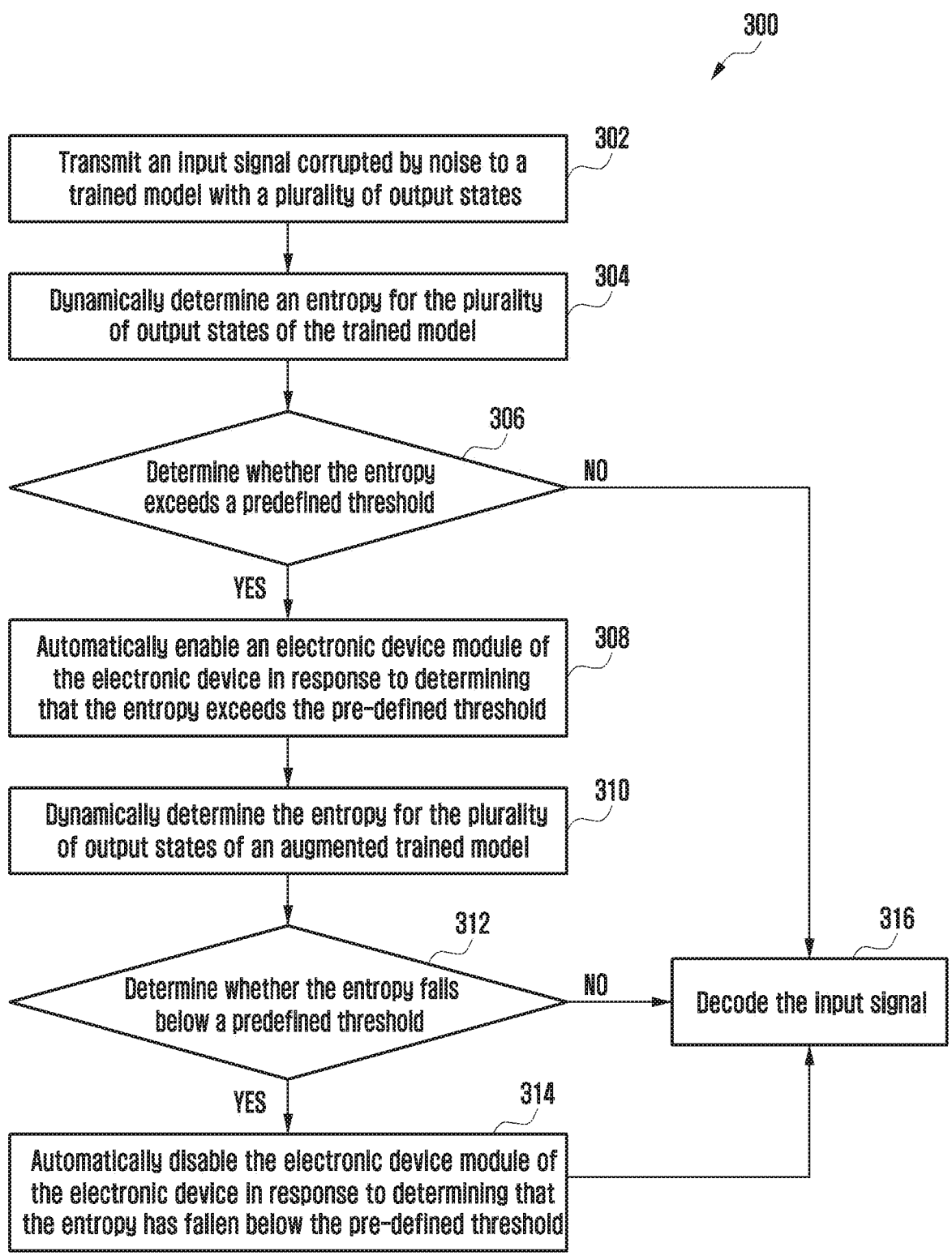
FIG. 3 is a flow diagram illustrating various operations for automatically managing operations of the electronic device, according to an embodiment as disclosed herein.

FIG. 3 is a flow diagram 300 illustrating various operations for automatically managing operations of the electronic device 100, according to an embodiment as disclosed herein.

At 302, the method includes transmitting the input signal corrupted by noise to the trained model with the plurality of output states. In an embodiment, the method allows the trained model controller 120b to transmit the input signal corrupted by noise to the trained model with the plurality of output states. The trained model is configured to train the input signal to provide the plurality of output states.

At 304, the method includes dynamically determining the entropy for the plurality of output states of the trained model. In an embodiment, the method allows the entropy determiner 120c to dynamically determine the entropy for the plurality of output states of the trained model.

At 306, the method includes determining whether the entropy exceeds the pre-defined threshold. In an embodiment, the method allows the entropy determiner 120c to determine whether the entropy exceeds the pre-defined threshold.

If the entropy exceeds the pre-defined threshold then, at 308, the method includes automatically enabling the electronic device module 110 of the electronic device 100. In an embodiment, the method allows the sensor controller 120d to automatically enable the electronic device module 110 of the electronic device 100 in response to determining that the entropy exceeds the pre-defined threshold.

If the entropy does not exceed the pre-defined threshold then, at 316, the method includes decoding the input signal. In an embodiment, the method allows the sensor controller 120d to decode the input signal in response to determining that the entropy does not exceed the pre-defined threshold.

In response to enabling the by the electronic device module 110, at 310, the method includes dynamically determining the entropy for the plurality of output states of the augmented trained model. In an embodiment, the method allows the entropy determiner 120c to dynamically determine the entropy for the plurality of output states of the augmented trained model.

At 312, the method includes determining whether the entropy falls below a pre-defined threshold. In an embodiment, the method allows the entropy determiner 120c to determine whether the entropy falls below a pre-defined threshold.

If the entropy falls below the pre-defined threshold then, at 314, the method includes automatically disabling the electronic device module 110 of the electronic device 100. In an embodiment, the method allows the sensor controller 12d to automatically disable the electronic device module 110 of the electronic device 100 in response to determining that the entropy has fallen below the pre-defined threshold. Further, the method continues the operation 316.

If the entropy does not fall below the pre-defined threshold then, the method decodes the input signal.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 4A:
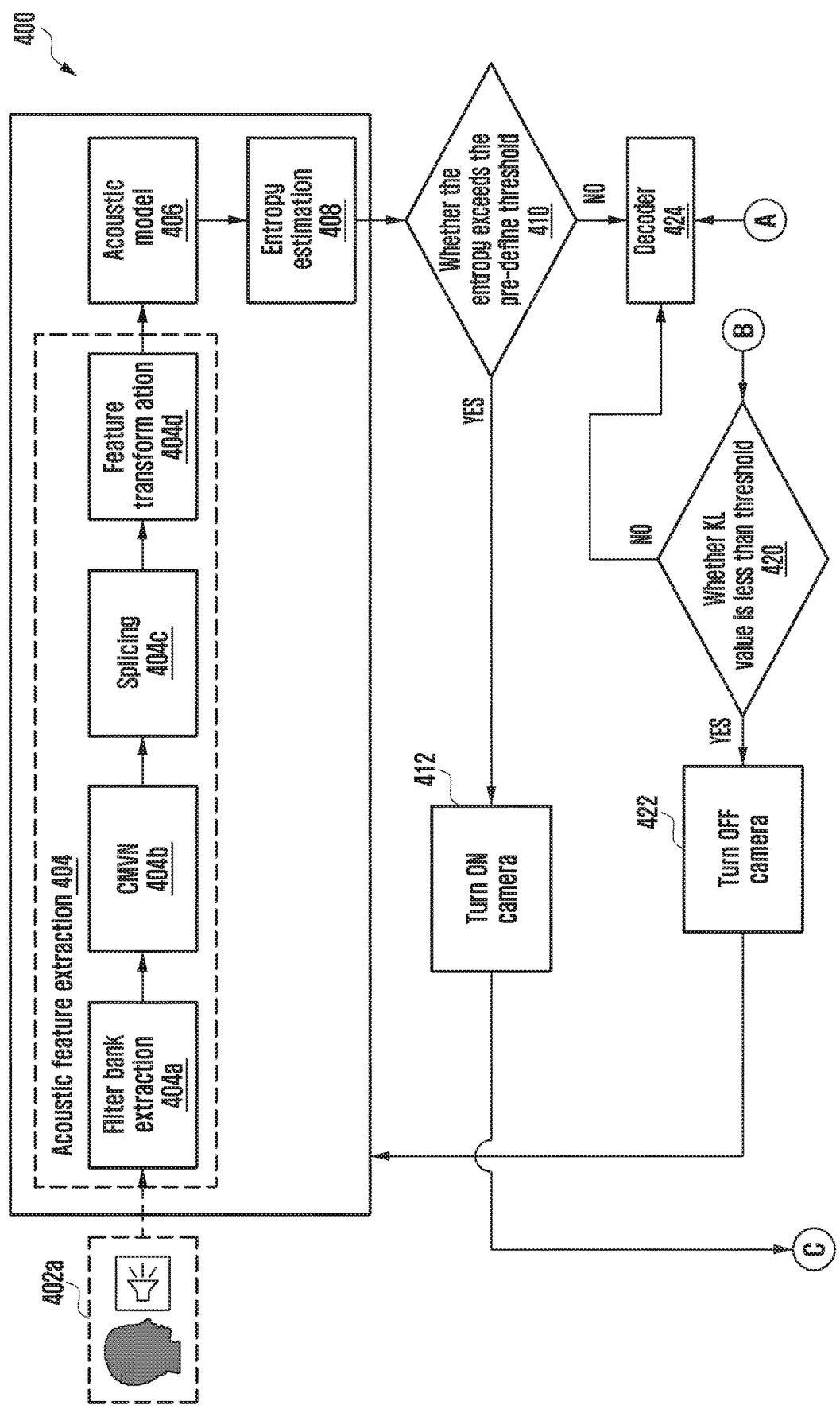
FIGS. 4A and 4B are a process flow diagram illustrating various operations performed in the electronic device for recognizing the speech of the user based on lip movements and acoustic features, according to an embodiment as disclosed herein.
Figure 4B:
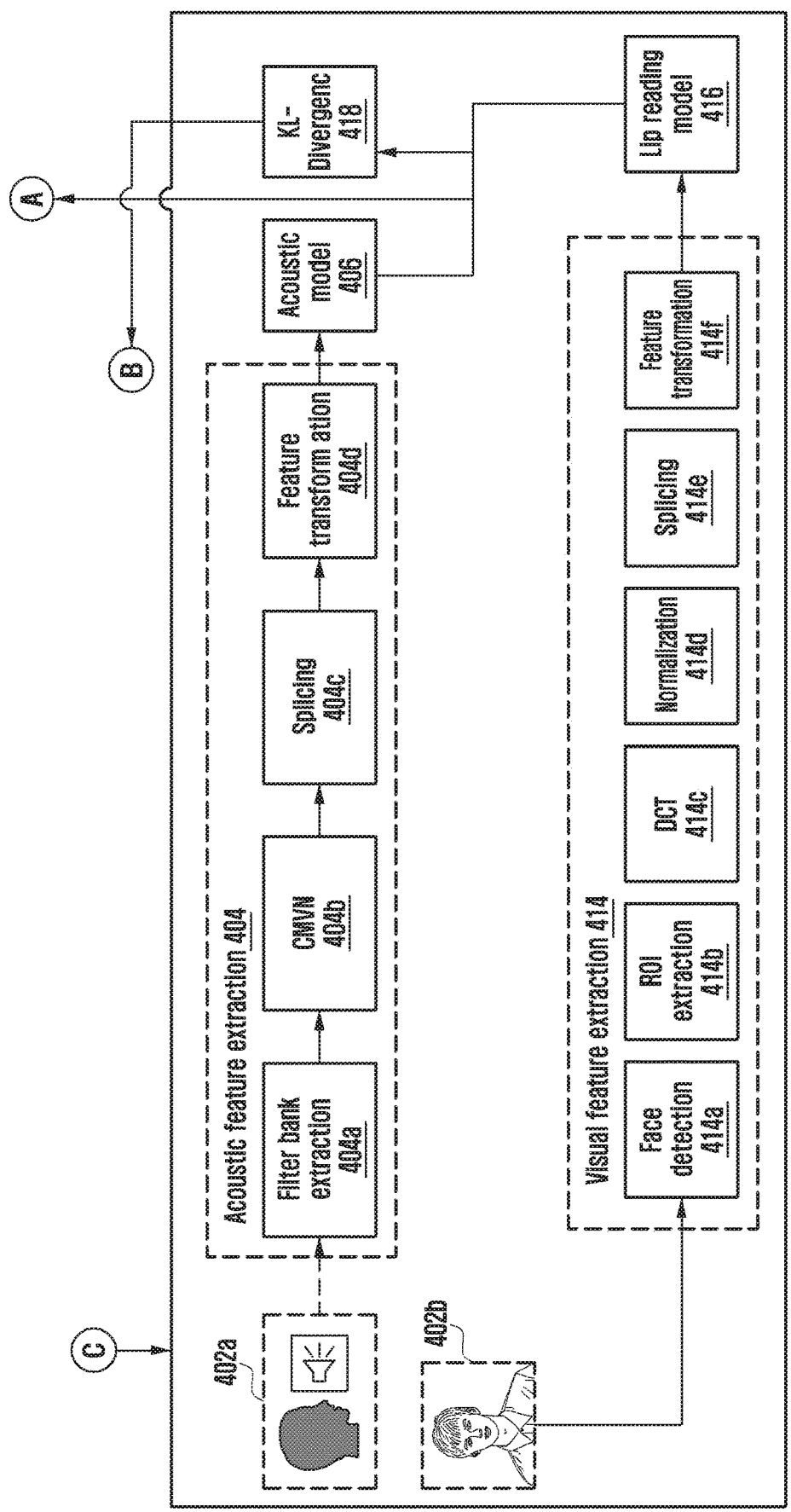

FIGS. 4A and 4B are a process flow diagram 400 illustrating various operations performed in the electronic device 100 for recognizing the speech of the user based on lip movements and acoustic features, according to an embodiment as disclosed herein.

In an embodiment, the electronic device 100 can include the sensor 110 configured to detect the input signal of the user, where the input signal includes the noise signal and the data signal. As shown in the FIGS. 4A and 4B, at 402a, the data signal can be the speech signal uttered by the user. Further, due to the background noise, the input signal may also include the noise signal.

The recognition engine 120 of the electronic device 100 is configured to process the input signal. At 404, the method includes extracting an acoustic feature from the data signal. In an embodiment, the method allows the feature extractor 120f to dynamically extract the acoustic feature from the data signal.

In an embodiment, the process of acoustic feature extraction 404 involves a filter bank extraction 404a, Cepstral Mean and Variance Normalization (CMVN) 404b, a splicing 404c and a feature transformation 404d. The filter bank extraction 404a extracts the acoustic feature from the acoustic signal. The CMVN 404b normalizes the mean and variance of the acoustic feature. The splicing 404c combines a context information with the acoustic feature. In an example, the context information can be a left frame/right frame of the extracted acoustic feature. The feature transformation 404d is the dimensionality reduction process.

Further, at 406, the method includes feeding the acoustic feature of the data signal into the acoustic model. The extracted acoustic feature is fed into the acoustic model 406 which predicts the probability of number of states. In an embodiment, the method allows the trained model controller 120b to feed the acoustic feature of the data signal into the acoustic model. In an example, the acoustic model can be a HMM or any deep neural network based classifier. The acoustic model used in the speech recognition can be used to represent a relationship between the speech signal and phonemes or any other linguistic units that constitute the speech of the user.

At 408, the method includes estimating the entropy. In an embodiment, the method allows the entropy determiner 120c to estimate the entropy. The entropy is a measure defined based on an amount of uncertainty outputted by the output of the acoustic model. Further, the entropy is inversely related to the SNR. The SNR is a ratio-measure that compares a power-level of the desired speech signal to the power-level of background noise. For example, if the SNR of the input signal is low then, there is a higher background noise in the input signal.

The output of the acoustic model is a discrete probability distribution of the class labels given the features of an acoustic frame as input. In an example, the class labels can be the Hidden Markov Model states when the acoustic model is the GMM-HMM, the DNN-HMM or the RNN-HMM, etc. In an example, the class labels can be a phoneme, characters, or the like.

Further, in an information theory, entropy or average information of a discrete random variable Y with possible values $\{y_1, y_2 \ldots y_n\}$ is defined in below equation (1):

$$H(Y) = -\Sigma_{i=1}^{n} P(y_i) \log P(y_i) \quad (1)$$

As the noise in the input signal is high, the acoustic model will be less certain that the input frame belongs to any one of the discrete classes. This increase in uncertainty of the acoustic model appears in the form of higher entropy. Hence, it is expected that when noise in the speech signal increases, the entropy at the output of the acoustic model increases accordingly.

At 410, the method includes determining whether the entropy exceeds the pre-defined threshold (for e.g., let the threshold be 0 dB). In an embodiment, the method allows the entropy determiner 120c to determine whether the entropy exceeds the pre-defined threshold.

If the entropy exceeds the pre-defined threshold then, at 412, the method includes turning ON the camera (such as sensor 110) of the electronic device 100. In an embodiment, the method allows the sensor controller 120d to turn ON the camera (such as sensor 110) of the electronic device 100 in response to determining that the entropy exceeds the pre-defined threshold.

If the entropy does not exceed the pre-defined threshold then, at 424, the method includes decoding the input signal. In an embodiment, the method allows the input signal recognizer 120e to decode the input signal. The input signal recognizer 120e is configured to recognize the speech based on decoding the acoustic feature associated with the input signal.

Further, once the camera of the electronic device 100 is turned ON then, the camera can be configured to capture the series of visual image frames of the user at 402b. The electronic device 100 captures the speech signal of the user at 402a. Further, the acoustic feature of the speech signal is extracted at 404 and the visual feature of the visual image frames are extracted at 414.

The process of acoustic feature extraction 404 is same as explained above. Further, the process of visual feature extraction 414 involves a face detection 414a, a ROI extraction 414b, Discrete Cosine Transform DCT 414c, normalization 414d, a splicing 414e and a feature transformation 414f. The face detection 414a can be configured to detect a face of the user from the visual image captured via the sensor 110. The ROI extraction 414b can extract the region of interest (such as lip) from the visual image. The DCT 414c performs feature dimensionality reduction for the extracted ROI. Further the normalization 414d normalizes the mean and variance of the extracted ROI from the visual feature. The splicing 414e combines a context information with the visual feature. The feature transformation 414f is the dimensionality reduction of the extracted visual feature.

The acoustic feature of the user is fed into the acoustic model at 406. The visual feature of the user is fed into the lip reading model at 416. The lip reading model is used in the visual aided speech recognition of understanding the speech of the user by visually interpreting the movements of the lips, face and tongue when normal speech signal is affected with high noise.

Furthermore, at 418, the method includes continuously computing the KL divergence between the acoustic model output and the lip-reading model output. In an embodiment, the method allows the input signal recognizer 120e to continuously compute the KL divergence between the acoustic model output and the lip-reading model output. The KL divergence is a measure of how one probability distribution (e.g., the acoustic output) diverges from a second, related probability distribution (e.g., the lip-reading model output).

At 420, the method includes determining whether the KL divergence value is less than the pre-defined threshold. In an embodiment, the method allows the input signal recognizer 120e to determine whether the KL divergence value is less than the pre-defined threshold.

If the KL divergence value is less than the pre-defined threshold then, at 422, the method includes turning OFF the camera (such as sensor 110) of the electronic device 100. In an embodiment, the method allows the sensor controller 120d to turn OFF the camera (such as sensor 110) of the electronic device 100 in response to determining that the KL divergence value is less than the pre-defined threshold.

If the KL divergence value is not less than the pre-defined threshold then, at 424, the method includes decoding the input signal. In an embodiment, the method allows the input signal recognizer 120e to decode the input signal. The input signal recognizer 120e is configured to recognize the speech of the user based on decoding the acoustic feature and the visual feature of the user.

Figure 5:
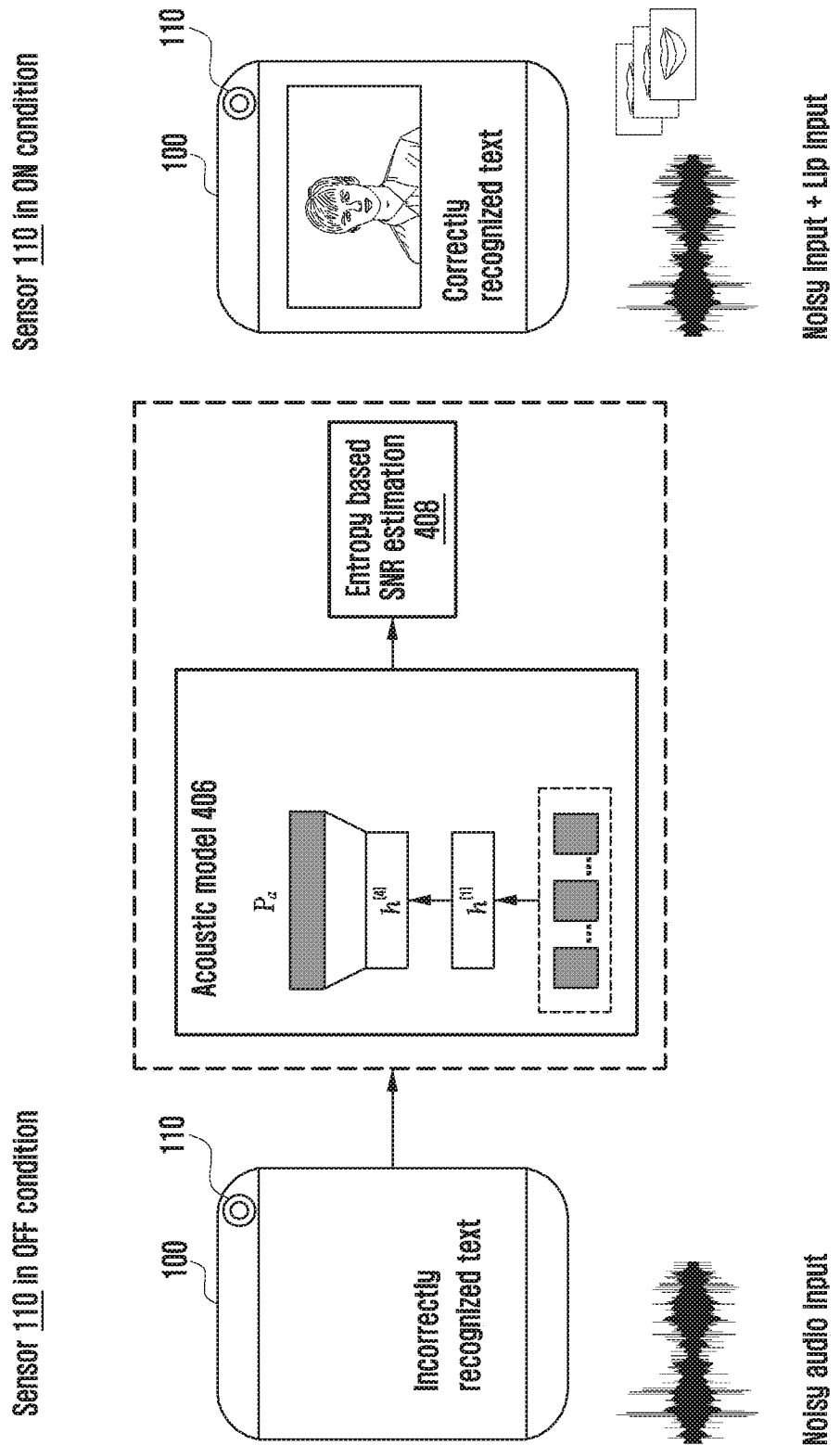
FIG. 5 is an example scenario in which the electronic device recognizes the speech of the user by enabling a sensor based on an entropy, according to an embodiment as disclosed herein.

FIG. 5 is an example scenario in which the electronic device 100 recognizes the speech of the user by enabling the sensor 110 based on the entropy, according to an embodiment as disclosed herein.

Consider a scenario in which the user provides voice commands (e.g., speech signal) to the electronic device 100 and initially the sensor 110 of the electronic device 100 is disabled. Let the user is in the noisy environment and the electronic device 100 receives the input signal which is accompanied with the noise. Further, the acoustic feature is extracted from the input signal. The acoustic feature is fed into the acoustic model at 406. The output of a probability distribution (Pa) of the acoustic model is the plurality of output states which is fed into entropy determiner 120c. The entropy determiner 120c is configured to continuously compute the entropy based SNR value for the output probability distribution (Pa) of acoustic model.

Further, the entropy determiner 120c is configured to determine whether the computed entropy based SNR value falls below the pre-defined threshold (for e.g., 0 dB). The entropy based SNR value is less compared to the pre-defined threshold as the noise in the input signal is high (due to the noisy environment). If the computed entropy based SNR value is less than the pre-defined threshold then, the sensor controller 120d can be configured to enable the sensor 110 (such as camera) to capture the series of visual features of the user as shown in the FIG. 5. Further, using the visual features of the user, the lip movement extractor 120g is configured to extract the lip movement of the user. Further, the electronic device 100 recognizes the speech signal by appending the acoustic feature with the lip movement of the user.

Figure 6:
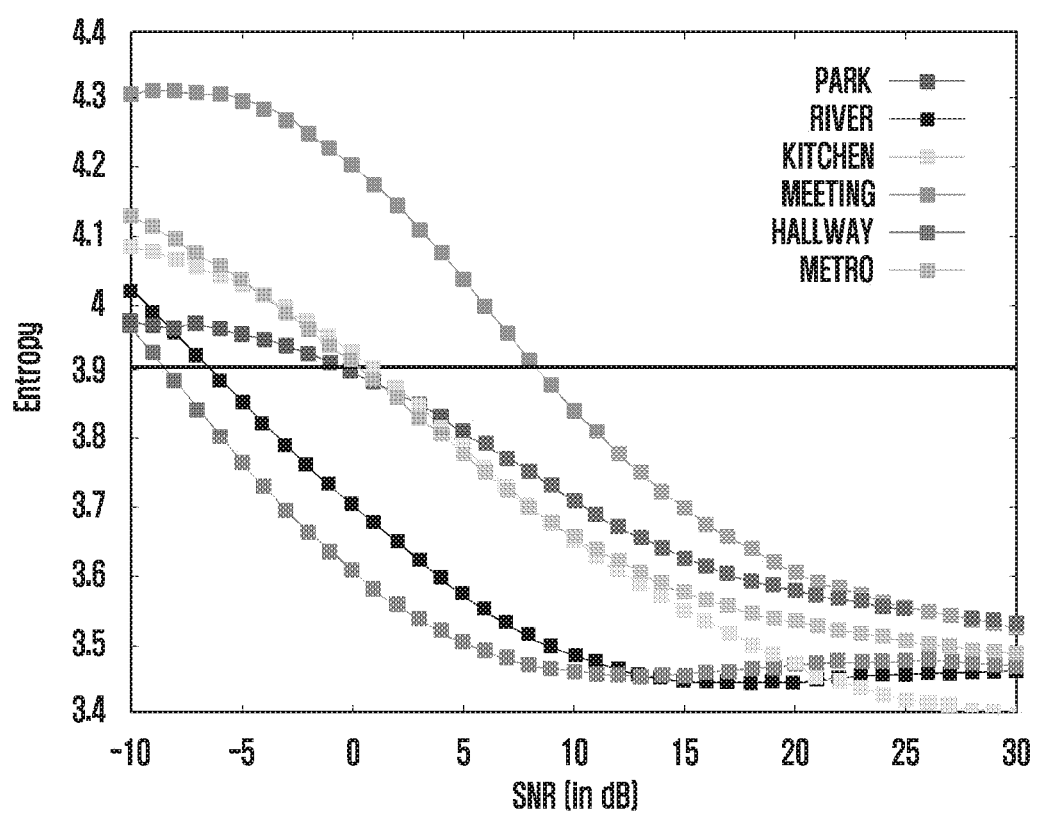
FIG. 6 is a graph depicting that the entropy inversely varies in accordance with a Signal-Noise Ratio (SNR), according to an embodiment as disclosed herein.

FIG. 6 is a graph depicting that the entropy inversely varies in accordance with the SNR, according to an embodiment as disclosed herein.

In conjunction with the FIG. 5, the entropy based SNR value is estimated for the input signal obtained from the environment. In an example, the environment can be a park, a river, a kitchen, a meeting location, a hallway, a metro or the like.

Consider the acoustic model used in the speech recognition is Deep Neural Network-Hidden Markov Model (DNN-HMM). The DNN-HMM model has an output layer size of 1415 HMM states. The acoustic model is trained on GRID audio corpus of 30000 utterances. Further, the acoustic model is tested with various noise profiles obtained from demand noise dataset. The acoustic model is configured to train the plurality of output states. Further, the probability distribution of the plurality of output states is computed. Further, the entropy is estimated for the probability distribution of the plurality of output states. As shown in the FIG. 6, the entropy varies almost inversely with SNR for all of the noise profiles. A decrease in SNR value is linear proportional to an increase in the entropy, which indicates increase in the noise signal. The SNR of the input signal is varied from −10 dB to 30 dB.

As shown in the FIG. 6, a horizontal line corresponds to a fixed entropy, the electronic device 100 is configured to look at a negative effect of noise in the way it reduces fundamental intelligibility of the input signal. Beyond this entropy, the camera has to be turned on to enhance intelligibility of the input signal.

In an example, consider a speech recognizer collects utterances from the multiple users and a visual-aided ASR fusion model is trained by using the camera. The acoustic model used herein is the DNN-HMM model. The DNN-HMM model is trained using the data from 75759 utterances. A test data includes 2278 utterances for non-overlapped/unseen users. Further, when acoustic model is aided with visual inputs, the improvement in the accuracy is given in a below table 1:

TABLE 1

| Improvement in accuracy of ASR system | | | | | | | |
|---|---|---|---|---|---|---|---|
| Non-Overlapping user Noise Type = Traffic Noise | | −10 dB WER | −5 dB WER | 0 dB WER | 5 dB WER | 10 dB WER | Clean WER |
| 512 neurons, 2 hidden layers | Audio-visual | 20.13 | 18.58 | 16.03 | 13.94 | 11.5 | 9.7 |
| | Audio | 24.74 | 19.74 | 17.95 | 16.32 | 14.67 | 11.69 |
| | Relative Improvement | 18.63 | 5.87 | 10.69 | 14.58 | 21.61 | 17.02 |

For a pure visual recognition, the Word Error Rate (WER) is 24.9.

Figure 7:
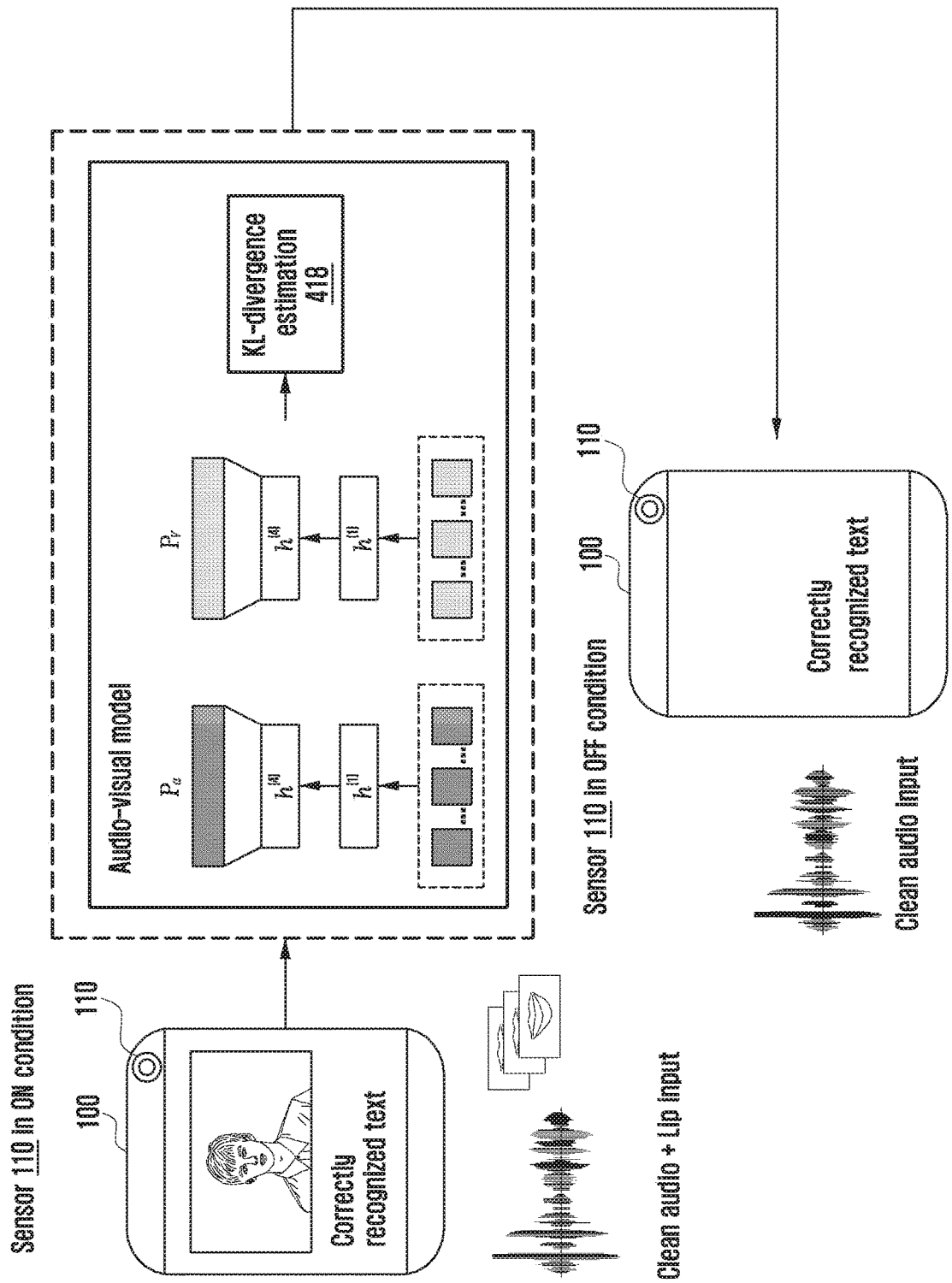
FIG. 7 is an example scenario in which the electronic device recognizes the speech of the user by disabling the sensor based on the entropy, according to an embodiment as disclosed herein.

FIG. 7 is an example scenario in which the electronic device 100 recognizes the speech of the user by disabling the sensor 110 based on the entropy, according to an embodiment as disclosed herein.

In conjunction with the FIG. 5, once the sensor 110 is enabled then, the sensor 110 is configured to capture the series of visual image frames of the user. The feature extractor 120f is configured to extract the acoustic feature from the input signal. The lip movement extractor 120g is configured to extract the lip movement from the visual image frames. Further, the acoustic feature and the lip movement are fed into an audio-visual model. The output of the probability distribution of the acoustic model $P_a$ and the output of the probability distribution of the visual model $P_v$ are fed to the KL divergence estimation process 418. The KL divergence is the measure of how much the probability distribution of the acoustic model $P_a$ varies from the probability distribution of the visual model $P_v$.

The electronic device 100 utilizes both the acoustic model and the visual model. The output of the log-likelihood of the combined audio-visual model is given by below equation (2):

$$\log P_{av}(O_{a,t}, O_{v,t}|k) = \gamma \log P_a(k|O_{a,t}) + (1-\gamma)\log P_v(k|O_{v,t}) - \log P(k) \quad (2)$$

Where r depends on noise level and reliability of each modality and is defined by the below equation (3):

$$\gamma = \frac{1}{1 + \exp(-D_{KL} + b)} \quad (3)$$

Where the $D_{KL}$ is defined by the below equation (4):

$$D_{KL}(P_v \| P_a) = \Sigma_i P_v \log P_a \quad (4)$$

Where a factor $D_{KL}(P_v \| P_a)$, is the KL divergence between the output probability distributions of acoustic model and the visual model. The KL-Divergence is the measure of distance between two probability distributions. Assuming for clean visual inputs, if the distance measure between Pa and Pv is less, then the noise in speech signal is very low.

As shown in the FIG. 7, the sensor controller 120d is configured to disable the sensor 110, as the noise signal in the input signal decreases. This results in reducing the power consumption of the electronic device 100, as the sensor is disabled when the noise signal in the input signal decreases. Furthermore, the recognition engine 120 is configured to recognize the input signal (such as clean audio input).

In an embodiment, in case of neural networks the posterior probabilities Pa and Pv are directly obtained from a soft-max layer. As the GMM-HMM is a generative model, the estimation of posterior distributions requires an additional step given below equation (5) and (6):

$$\log P_a(O_{a,t}|k) + \log P(k) = \log P_a(k|O_{a,t}) \quad (5)$$

$$\log P_v(O_{v,t}|k) + \log P(k) = \log P_v(k|O_{v,t}) \quad (6)$$

Where k is the state of the HMM and P (k) denotes the prior probability of state k. Further, using the above equation (5) and (6), the entropy and the KL-Divergence of the plurality of output states can be computed.

Figure 8:
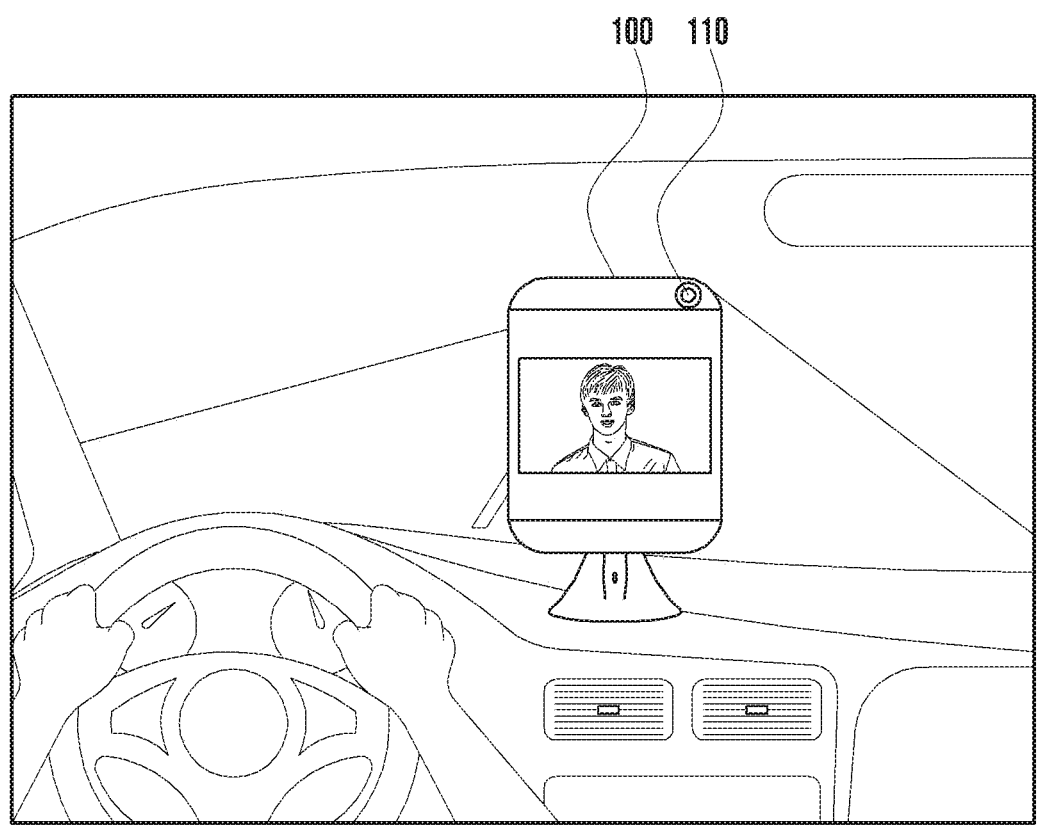
FIG. 8 is an example scenario in which the electronic device recognizes the speech of the user in a noisy environment, according to an embodiment as disclosed herein.

FIG. 8 is an example scenario in which the electronic device 100 recognizes the speech of the user in the noisy environment, according to an embodiment as disclosed herein.

Consider a scenario in which the user is driving a car, where a music is continuously playing in the car. Further, the user needs to provide navigation commands to an infotainment display of the car using the electronic device 100 (such as smartphone). Let the user provides the voice commands such as 'play all the music in a favorite list' via a voice assistant of the electronic device 100. The electronic device 100 receives the voice command of the user. However, the speech signal in the voice command is affected by the background noise (such as music, traffic, etc.). Hence, the entropy of the speech signal increases with the increase in the noise signal.

Further, the electronic device 100 triggers the sensor 110 (such as camera) in response to determining that the entropy of the speech signal exceeds the pre-defined threshold. The sensor 110 is configured capture the visual image of the user as shown in the FIG. 8. The electronic device 100 dynamically extracts the acoustic features from the voice command and lip movements of the user from the visual image. Further, the electronic device 100 recognizes the speech of the user by appending the acoustic features and the lip movements of the user.

Figure 9:
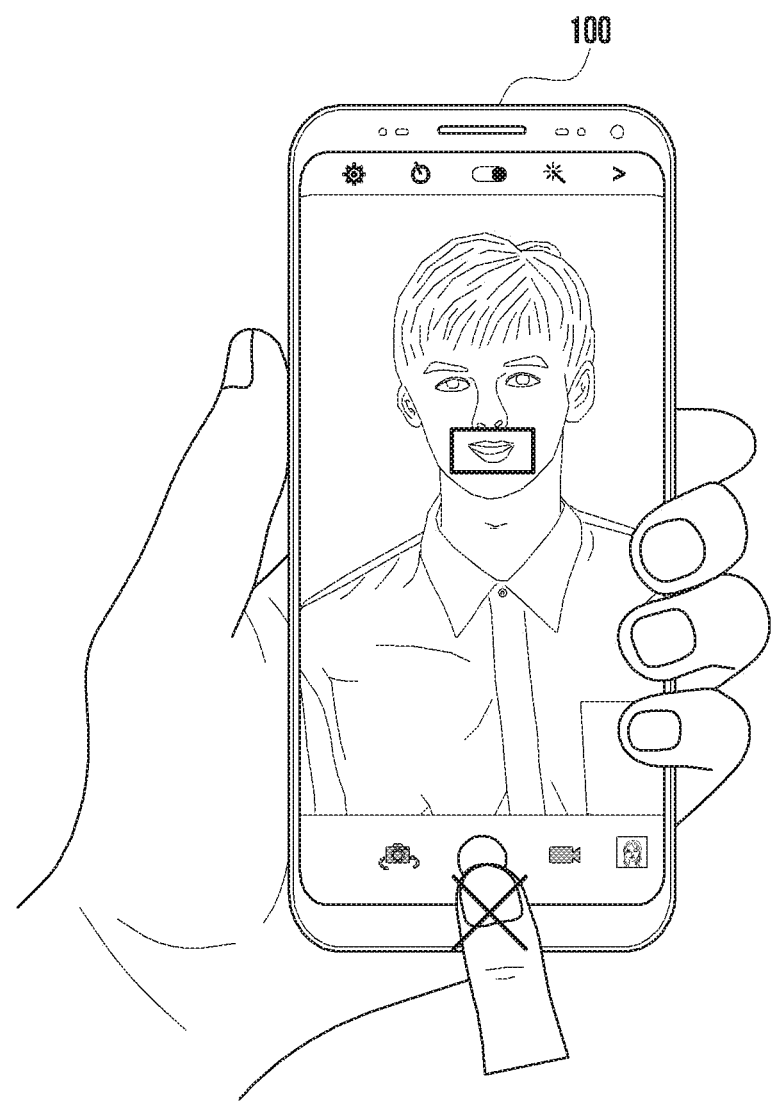
FIG. 9 is an example scenario in which the user can operate the electronic device via a voice command, according to an embodiment as disclosed herein.

FIG. 9 is an example scenario in which the user can operate the electronic device 100 via a voice command, according to an embodiment as disclosed herein.

Consider a scenario in which the user wishes to take a selfie picture using the electronic device 100 (such as smartphone). Further, the user can operate the camera of the smartphone by providing the voice commands such as click, zoom, or the like. The electronic device 100 receives the voice command of the user. If the voice command is affected by the background noise, then the electronic device 100 triggers the sensor 110 (such as camera) to capture the visual image of the user as shown in the FIG. 9. The electronic device 100 dynamically extracts the acoustic features from the voice command and lip movements of the user from the visual image. Further, the electronic device 100 recognizes the speech of the user by appending the acoustic features and the lip movements of the user. Further, the electronic device 100 takes the selfie picture based on the voice command by the user. This results in improving the user experience using the speech recognition system.

Figure 10:
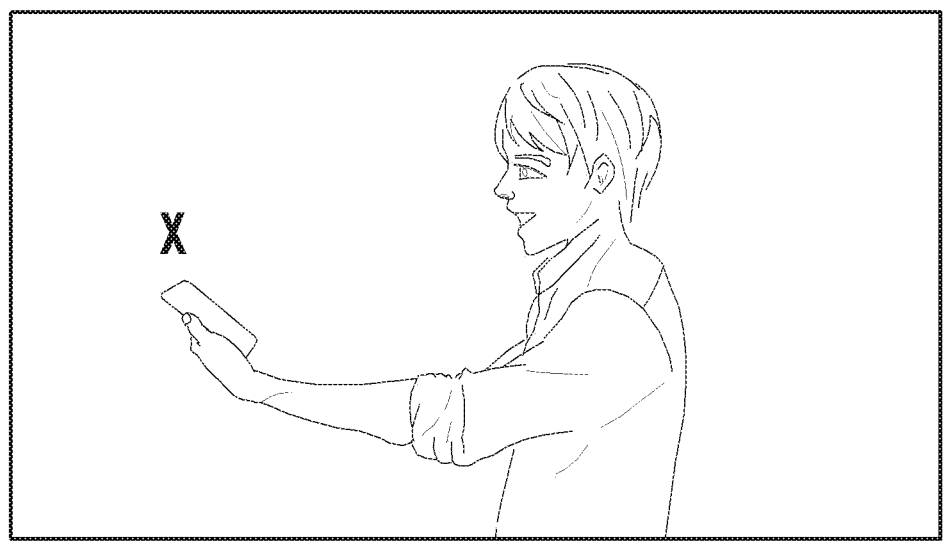
FIG. 10 is an example scenario in which the electronic device recognizes a whispering action of the user, according to an embodiment as disclosed herein.

FIG. 10 is an example scenario in which the electronic device recognizes a whispering action of the user, according to an embodiment as disclosed herein.

Consider a scenario in which the user is located in a meeting room and wishes to provide the voice command to the electronic device 100 (such as smartphone). In order to maintain a privacy, the user can provide the voice command via the whispering action as shown in the FIG. 10. The electronic device 100 receives the whispering action of the user.

If the voice command is affected by the background noise due to whispering action, then the electronic device 100 triggers the sensor 110 (such as camera) to capture the visual image of the user. The electronic device 100 dynamically extracts the acoustic features from the whispering action and lip movements of the user from the visual image. Further, the electronic device 100 recognizes the voice command provided by the user by appending the acoustic features and the lip movements of the user. This results in improving the user experience using the speech recognition system.

In an embodiment, using the speech recognition system, the electronic device 100 performs a same set of operations to dynamically identify the Caller ID of the user (such as calling person).

Figure 11:
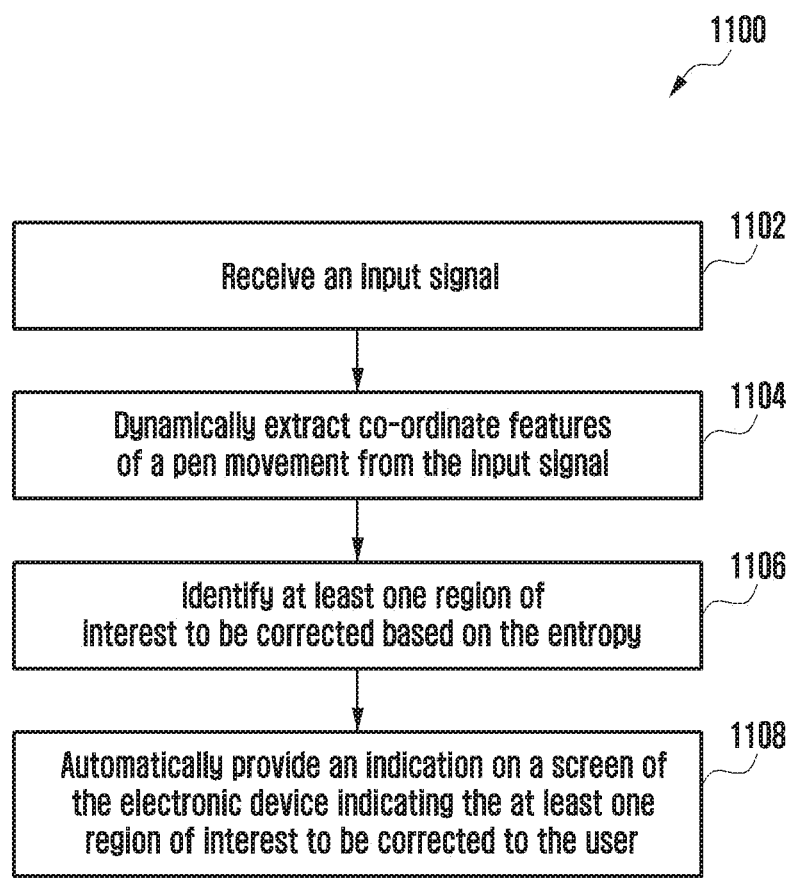
FIG. 11 is a flow diagram illustrating various operations for automatically providing a suggestion to the user based on the estimated entropy, according to an embodiment as disclosed herein.

FIG. 11 is a flow diagram 1100 illustrating various operations for automatically providing a suggestion to the user based on the estimated entropy, according to an embodiment as disclosed herein.

At 1102, the method includes receiving the input signal. In an embodiment, the method allows the input signal receiver 120a to receive the input signal. Further, at 1304, the method includes dynamically extracting the co-ordinate features of the pen movement from the input signal. In an embodiment, the method allows the feature extractor 120f to extract the co-ordinate features of the pen movement from the input signal.

At 1106, the method includes identifying the at least one ROI to be corrected based on the entropy. In an embodiment, the method allows the ROI extractor 120h to identify the at least one ROI to be corrected based on the visual features.

At 1108, the method includes automatically providing the indication on the screen of the electronic device 100 indicating the at least one region of interest to be corrected to the user. In an embodiment, the method allows the input signal recognizer 120e to automatically provide the indication (such as suggestion) on the screen of the electronic device 100 indicating the at least one region of interest to be corrected to the user.

Consider an example scenario in which the user writes the text on the display 160 of the electronic device 100 (such as smartphone) using the stylus. A handwriting recognition system in the electronic device 100 captures the (x and y) coordinates at regular time intervals from a movement of the stylus. The sequence of coordinates is fed into the GMM-HMM or RNN model followed by the decoder which outputs the text. The entropy for the output of the GMM-HMM or RNN model is computed to determine the intelligibility of the user's handwriting. If the entropy is high then, greater is the unintelligibility of the user's handwriting. If the user's handwriting is highly unintelligible (i.e. not clear) then, the handwriting recognition system notifies the unintelligible portion of the text to user to repeat (or rewrite) the particular characters or word for more accurate recognition.

Consider an example scenario in which the electronic device 100 configured to receive by a trained complex model which is an appropriate sequential and/or parallel combination of two or more network models trains the multiple input signals one of which is possibly corrupted by noise. In an embodiment, these individual sequential and/or parallel combination of two or more network models receives different type/modality of input from perhaps a completely different type of sensor, such as one model receiving input from the camera and another model receiving input from a microphone. Further, the input signals simultaneously coming from the same object (for example, the image and sound from the same moving lip in speech).

Further, the electronic device 100 is configured to dynamically determine any model-cross-correlation measure inside the trained model that attempts to cross-correlate the different but simultaneous inputs to the system (for example acoustic signal from microphone and lip image from camera) by cross-correlating the individual output-state probability vectors of the individual trained model. In an embodiment, the cross-correlating of the vectors across trained model can for example be achieved by a well-known concept such as KL-Divergence, which is a mutual information based generalization of the concept of entropy.

In an embodiment, the cross-correlation of the individual output-state probability vectors of the individual trained mode is the only way to compare two completely different types of synchronous input signals (for example sound and image) which are capturing the same event (for example speech). Further, the so measured cross correlation (of the probability vector or some such similar vector) being intended to inversely capture the amount of noise that corrupts one input sensor but not the other input sensor (for example acoustic noise will corrupt microphone output but not the camera output, and similarly a shake or blur will corrupt camera output but not microphone output).

In an embodiment, when such a measured cross correlation of the input signals rises above a certain threshold therefore implying that both sensor signals are sufficiently clean (for example no noise or blurriness) so that switching off one sensor completely or partially (thus saving power etc.) will not adversely affect the recognition accuracy of the input stream, and one sensor alone may be sufficient to obtain the highest accuracy.

In an embodiment, when such a measured cross correlation of the input sensor falls below a certain threshold also implying that one of the sensor signals is affected by noise (for example microphone in bus noise) and its corresponding model (say the speech recognition learnt model component) by itself cannot provide sufficient recognition accuracy of the input stream, and therefore two or more independent sensors may be necessary to maintain the recognition accuracy until the acoustic noise decreases (even though additional power may be needed to run both sensors and a more complex fusion learnt model may also be needed). The purpose of computing this cross correlation measure and threshold (which can only be computed when both sensors are powered on) being to determine when there is less noise and one of the sensors can be turned off (noting that this measure therefore cannot be used to turn on a sensor but only to turn an unneeded sensor off).

The various actions, acts, blocks, steps, or the like in the flow diagram 1100 may be performed in the order presented, in a different order or simultaneously. Further, in some embodiments, some of the actions, acts, blocks, steps, or the like may be omitted, added, modified, skipped, or the like without departing from the scope of the invention.

FIG. 12 is a flow diagram 1200 illustrating various operations for automatically controlling the level of correctness of the input signal based on the entropy, according to an embodiment as disclosed herein.

At 1202, the method includes receiving the input signal. In an embodiment, the method allows the input signal receiver 120a to receive the input signal.

At 1204, the method includes dynamically extracting the visual features from the input signal. In an embodiment, the method allows the feature extractor 120f to dynamically extract the visual features from the input signal.

At 1206, the method includes determining the level of correctness required based on the visual features and the entropy. In an embodiment, the method allows the input signal recognizer 120e to determine the level of correctness required based on the visual features and the entropy.

At 1208, the method includes automatically controlling the level of correctness by the by the electronic device module 110. In an embodiment, the method allows the by the electronic device module 110 to automatically control the level of correctness. For example, the level of correctness can include at least one of turning on lights, turning on flash, changing a pose, sharpness increases, changing aperture setting, increasing frame rate, improving the sharpness of the input signal, improving the contrast of the input signal, improving the brightness of the input signal, improving the illumination, or the like.

Consider an example a scenario for an image recognition in which the level of correctness is determined by computing the entropy of an input image. The entropy of the input image is determined by the deep neural network model. The deep neural network model involves a multi-class classification which recognizes a set of objects in the input image. Further, the output of the deep neural network model includes a set of states whose probability is same as the automatic speech recognition. Hence, the entropy can also be similarly defined on the set of states in an image recognition model. When the image recognition model encounters noise in the visual image (due to low lighting conditions, occlusions, wrong-pose, or the like) then the entropy increase. This entropy measure on the plurality of output states of the image recognition model can be used to suggest the user to turn ON lights, turn ON flash, change pose, increase capture resolution, change aperture setting, increase frame rate or the like.

In an example, consider a scenario of a self-driving vehicle in which the entropy measure can be used to override an autopilot mode and allow the user to take a control of the self-driving vehicle.

Consider a scenario in which the user is playing games using the electronic device 100, where the input signal for the game is the movement of user's hand. The electronic device 100 receives by a trained the input signal that is possibly corrupted by small oscillating noises/disturbances that cause changes to the true signal. The electronic device 100 dynamically determines the entropy of certain functions of the input signal over a current dynamic time-window (whose window-size is selected such that the changes or rate of changes of the true signal are fewer in this window, whereas the disturbances are far more numerous). Further, the entropy increases results from larger disturbances. In response to the larger disturbance, the electronic device 100 automatically enables a signal-correction, the correction being determined by the entropy (for example, the multiplicative or additive integration constant of an accelerometer or gyro signal can be smaller if the combined entropy is larger). Further, the electronic device 100 determines the amount of correction required on the input signal, where the corrected signal can be used as the input of the game.

The various actions, acts, blocks, steps, or the like in the flow diagram 1200 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements shown in the FIGS. 1 through 12 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for automatically managing operations of an electronic device, comprising:
    transmitting an input signal corrupted by noise to a trained model with a plurality of output states;
    dynamically determining an entropy for the plurality of output states of the trained model using Kullback-Leibler (KL) divergence;
    determining whether the entropy exceeds a pre-defined threshold;
    automatically enabling an electronic device module of the electronic device in response to determining that the entropy exceeds the pre-defined threshold;
    capturing a series of visual image frames of a user using the electronic device module;
    dynamically extracting lip movements of the user from the series of visual image frames;
    dynamically extracting acoustic features from the input signal;
    transmitting the lip movements and the acoustic features to the trained model; and
    recognizing a speech of the user using the trained model, wherein recognizing the speech of the user comprises:
        determining a first portion of the speech from visual features,
        determining a second portion of the speech from the acoustic features, and
        recognizing the speech of the user by appending the first portion and the second portion, and
    wherein dynamically extracting the lip movements of the user from the series of visual image frames comprises:
        detecting whether the lip movements of the user are in at least one visual image frame of the series of visual image frames, and
        extracting the lip movements of the user from the at least one visual image frame of the series of visual image frames.

2. The method of claim 1, further comprising:
    dynamically determining the entropy for the plurality of output states of the trained model;
    determining whether the entropy falls below the pre-defined threshold; and
    automatically disabling the electronic device module in response to determining that the entropy has fallen below the pre-defined threshold.

3. The method of claim 1, wherein the entropy is determined by:
    estimating a probability distribution for the plurality of output states of the trained model; and
    determining the entropy of the probability distribution.

4. The method of claim 1, further comprising:
    dynamically extracting co-ordinate features of a pen movement from the input signal;
    identifying at least one region of interest to be corrected based on the entropy by the electronic device module; and
    automatically providing an indication to the user on a screen of the electronic device specifying at least one region of interest to be corrected.

5. The method of claim 1, further comprising:
    dynamically extracting the visual features from the input signal;
    determining a level of correctness required based on the visual features and the entropy; and
    automatically controlling a level of correctness by the electronic device module.

6. The method of claim 1 wherein an indication is displayed on a screen of the electronic device specifying that the input signal is corrupted by noise in response to determining that the entropy exceeds the pre-defined threshold.

7. The method of claim 1 wherein the trained model is at least one of a Deep-learning based model, a Hidden Markov model, a Finite State model, or a Pattern Classification model.

8. An electronic device with automatic management of operations, the electronic device comprising:
    a memory;
    a processor; and
    a recognition engine, coupled with the memory and the processor, configured to:
        transmit an input signal corrupted by noise to a trained model with a plurality of output states;
        dynamically determine an entropy for the plurality of output states of the trained model using Kullback-Leibler (KL) divergence;
        dynamically extract acoustic features from the input signal;
        determine whether the entropy exceeds a pre-defined threshold;
        automatically enable an electronic device module of the electronic device in response to determining that the entropy exceeds the pre-defined threshold;
        capture a series of visual image frames of a user using the electronic device module;
        dynamically extract lip movements of the user from the series of visual image frames;

transmit the lip movements and the acoustic features to the trained model; and recognize a speech of the user using the trained model, wherein recognizing the speech of the user comprises:

determining a first portion of the speech from visual features, determining a second portion of the speech from the acoustic features, and recognizing the speech of the user by appending the first portion and the second portion, and wherein dynamically extracting the lip movements of the user from the series of visual image frames comprises:

detecting whether the lip movements of the user are in at least one visual image frame of the series of visual image frames, and extracting the lip movements of the user from the at least one visual image frame of the series of visual image frames.

9. The electronic device of claim 8, wherein the recognition engine is further configured to:

dynamically determine the entropy for the plurality of output states of the trained model;

determine whether the entropy falls below the pre-defined threshold; and automatically disable the electronic device module in response to determining that the entropy has fallen below the pre-defined threshold.

10. The electronic device of claim 8, wherein the recognition engine is configured to determine the entropy by:

estimating a probability distribution for the plurality of output states of the trained model; and determining the entropy of the probability distribution.

11. The electronic device of claim 8, wherein the recognition engine is further configured to:

dynamically extract co-ordinate features of a pen movement from the input signal;

identify at least one region of interest to be corrected based on the entropy by the electronic device module; and automatically provide an indication to the user on a screen of the electronic device specifying at least one region of interest to be corrected.

12. The electronic device of claim 8, wherein the recognition engine is further configured to:

dynamically extract the visual features from the input signal;

determine a level of correctness required based on the visual features and the entropy; and automatically control a level of correctness by the electronic device module.

13. The electronic device of claim 8 wherein the recognition engine is configured to display an indication on a screen of the electronic device specifying that the input signal is corrupted by noise in response to determining that the entropy exceeds the pre-defined threshold, and where the trained model is at least one of a Deep-learning based model, a Hidden Markov model, a Finite State model, or a Pattern Classification model.

* * * * *